United States Patent
Ng et al.

(10) Patent No.: US 6,529,372 B1
(45) Date of Patent: Mar. 4, 2003

(54) WEARABLE COMPUTER-BATTERY SYSTEM

(75) Inventors: Richard Ng, Centreville, VA (US);
Peter S. Hong, Bristow, VA (US);
Peter A. Ronzani, Los Gatos, CA (US)

(73) Assignee: Xybernaut Corp., Fairfax, VA (US)

( * ) Notice: Subject to any disclaimer, the term of this patent is extended or adjusted under 35 U.S.C. 154(b) by 55 days.

(21) Appl. No.: 09/932,591

(22) Filed: Aug. 17, 2001

(51) Int. Cl.[7] .............................. H05K 7/10; H05K 5/02; H01M 2/10
(52) U.S. Cl. ..................... 361/683; 361/728; 429/100; 312/223.2
(58) Field of Search ............................... 361/679–686, 361/724–731, 733, 747; 312/223.2; 345/168, 169; 429/96–100

(56) References Cited

U.S. PATENT DOCUMENTS

| | | | | |
|---|---|---|---|---|
| 4,876,724 A | * | 10/1989 | Suzuki | 381/385 |
| 5,285,398 A | | 2/1994 | Janik | |
| 5,305,244 A | | 4/1994 | Newman et al. | |
| 5,416,310 A | * | 5/1995 | Little | 235/462.44 |
| 5,491,651 A | | 2/1996 | Janik | |
| 5,572,401 A | * | 11/1996 | Carroll | 361/683 |
| 5,774,338 A | * | 6/1998 | Wessling, III | 361/730 |
| 5,786,984 A | * | 7/1998 | Bonardi et al. | 361/686 |
| 5,798,907 A | * | 8/1998 | Janik | 361/683 |
| 5,844,824 A | | 12/1998 | Newman et al. | |
| 6,047,301 A | * | 4/2000 | Bjorklund et al. | 708/139 |
| 6,108,197 A | * | 8/2000 | Janik | 361/683 |
| 6,137,675 A | * | 10/2000 | Perkins | 361/679 |
| 6,167,413 A | * | 12/2000 | Daley, III | 708/139 |
| 6,235,420 B1 | | 5/2001 | Ng | |
| 6,262,889 B1 | * | 7/2001 | Newman et al. | 361/687 |
| 6,324,053 B1 | * | 11/2001 | Kamijo | 361/683 |
| 6,385,041 B1 | * | 5/2002 | Choi | 361/686 |
| 6,457,024 B1 | * | 9/2002 | Felsentein et al. | 345/8 |
| 2002/0024512 A1 | * | 2/2002 | Terasawa et al. | 345/204 |
| 2002/0074370 A1 | * | 6/2002 | Quintana et al. | 224/262 |
| 2002/0081895 A1 | * | 6/2002 | Ocheltree et al. | 439/540.1 |
| 2002/0084990 A1 | * | 7/2002 | Peterson, III | 345/169 |
| 2002/0097333 A1 | * | 7/2002 | Wechsler et al. | 348/373 |
| 2002/0145849 A1 | * | 10/2002 | Peterson, III | 361/683 |

FOREIGN PATENT DOCUMENTS

WO    WO 98/43145 A2  * 10/1998

* cited by examiner

*Primary Examiner*—Anatoly Vortman

(57) ABSTRACT

This invention uses a portable computer housing with a battery holder connected directly onto this battery housing. This arrangement does away with the need for cumbersome connecting cables or wires and places the battery at a location where it could be easily changed or removed. The housing and holder have mating electrical connectors so that they can be in electrical connection without need for wires, cables or other clumsy connectors.

23 Claims, 5 Drawing Sheets

WEARABLE COMPUTER-BATTERY SYSTEM

This invention relates to a computer and, more specifically, to a user-supported mobile computer.

BACKGROUND OF THE INVENTION

There are known in the art computers that have been used involving wearable computers and peripheral computer components. The feature of these prior art computers is that they permit the user to have freedom to use his or her hands for repairing or other functions while using a fully functional computer. One of the most commercially successful and well known of these computers is the Mobile Assistant® available from Xybemaut Corporation of Fairfax, Va. Mobile Assistant® is a registered trademark of Xybernaut Corporation.

U.S. Pat. No. 5,305,244 (Newman, et al.) and U.S. Pat. No. 5,855,824 (Newman et al.) describe the details of the Mobile Assistant® and fully disclose the components and function of such user-supported computers. Both U.S. Pat. Nos. 5,305,244 and 5,844,824 are owned by the assignee of the present application.

Also disclosing wearable computers are U.S. Pat. No. 5,285,398 (Janik I) and U.S. Pat. No. 5,491,651 (Janik II). Both of these patents disclose a belt computer containing the elements or components of a computer. In Janik I, the plurality of computing elements are located on the belt and a flexible signal relaying means connects all of the elements for computing. A protective covering is used for enclosing said computer elements. In Janik II, a similar belt computer is described and claimed in which the signal relaying means, the length of which between any two computing elements is greater than the length of the wearable number between any two computing elements. In both Janik I and Janik II, the flexible wearable computer is in the form of a belt comprising around its periphery sequentially positioned computer elements. It is an objective of all wearable computers that the size of the components be as small as possible and as light as possible without sacrificing performance. The use of a battery is necessary in all wearables and the accessibility of the battery to the user is an important element. Many wearables have the battery as a separate unit connected by cables to the computer housing. While there are advantages to this arrangement, there are also some disadvantages such as cables interfering with the user's objectives.

SUMMARY OF THE INVENTION

It is therefore an object of this invention to provide a computer structure devoid of the above-noted disadvantages.

A further object of this invention is to provide a computer structure and battery that when worn can be used interchangeably on the right or left side of a user.

A still further object of this invention is to provide a mobile computer structure and battery that can be worn on any portion of the body in a hands-free manner.

Another still further object of this invention is to provide a mobile computer having outlets or other means to connect onto or outlets comparable with components of a stand along, laptop or desktop computer.

Yet another object of this invention is to provide a computer structure that contains substantially all of the components needed in a general purpose or conventional computer including but not limited to input/output means, processor means and storage means.

A further object of this invention is to provide a wearable computer housing having connecting means adapted to be connected to and immediately adjacent a battery holder which does not require connecting wires or cables.

Yet still another object of this invention is to provide a mobile body-worn computer that can be worn and operated by both right and left-handed users.

Other objects will become apparent upon a further reading of this disclosure.

The above objects and others are accomplished, generally speaking, by a computer housing structure containing a conventional computer that has a cable-less connector adapted for connection with a mating connector on a battery holder. By "conventional computer" is meant any general purpose computer known and used today such as those available from IBM, Dell, Apple, Gateway, Compaq, Toshiba, Micron, Hewlett-Packard etc. The computer structure of this invention in one embodiment has a computer housing and battery holder that can be worn around the waist of a user and is curved on its inner side (the side that contacts the user's waist) to be contoured in accordance with the curvature of the user's waist. It has structural dimensions or area that occupies only a portion of said user's waistline. Thus, unlike Janik I and II above discussed, the housing does not encircle the entire waist of the user. In the prior art, when used as a torso or waist-worn computer, it was important that battery connection cables and other electrical connections extend from the computer so as to be out of the way and not interfere with the user" hands when he or she is attempting to repair an object or machine or otherwise use their hands. The optimum would be the elimination of the battery connecting cable entirely. The present invention provides this. The housing of the computer of this invention has outlets for cable-less connection to other components such as power supplies, monitors, keyboards or any other required component. All embodiments of a mobile computer described in U.S. Pat. Nos. 5,844,824 and 5,305,244 are included in those structures usable in the present invention with the modification described and claimed herein. The disclosure of these two patents are incorporated by reference into the present disclosure.

The embodiment of this invention that includes voice activation when the computer is body-worn also includes a body-worn display screen such as a head-worn, arm-worn display, neck-hung or other suitable display. The computer housing in the present invention includes all of the components found in a conventional computer such as a storage means, processor means, audio transducer and converter means, and recognizing means, all of which are described in detail in U.S. Pat. Nos. 5,305,244 and 5,844,824. Also included in this embodiment are means for mounting the computer housing onto a user; generally, attachment is made on a belt worn by a user such as around the waist, around the neck or wrist, over the shoulder or onto a vest, hereinafter torso worn. The sides of the computer housing can be ribbed or louvered to permit heat to be dissipated from the interior of the housing and to allow proper internal temperature best suited for computer operation. The computer housing, generally, is made of a lightweight yet rigid plastic or other suitable material. This housing preferably comprises a single internal compartment that houses substantially all of the components of a conventional computer. It can be contoured or curved to follow the curvature of the human body such as the waistline. The portion of the computer housing that contacts the user's body is referred to in this invention as "the inner side".

The battery holder or the computer housing of the present invention can contain other peripherals or other components such as a five wire means, USB, a built-in wireless system, PCMCIA slot, a compact flask slot or ACF. Also a floating ribbon connector can be built around the attaching belt (below as element 2 so a user can position the structure of this invention anywhere around the belt.

The novel structure or computer system of this invention comprises a wearable computer housing having cable-less connection means to an attached battery holder. The computer housing is a substantially rigid computer housing having a single internal compartment that houses substantially all of the components of a conventional computer. The housing has a pin connector (or other suitable connector) to connect with a mating connector in the battery holder. The battery holder is attached to the computer housing at a location on said housing other than a side immediately adjacent the user's body, hereinafter described in the specification and claims as the "inner side".

DESCRIPTION OF THE DRAWINGS AND PREFERRED EMBODIMENTS

Figure 1:
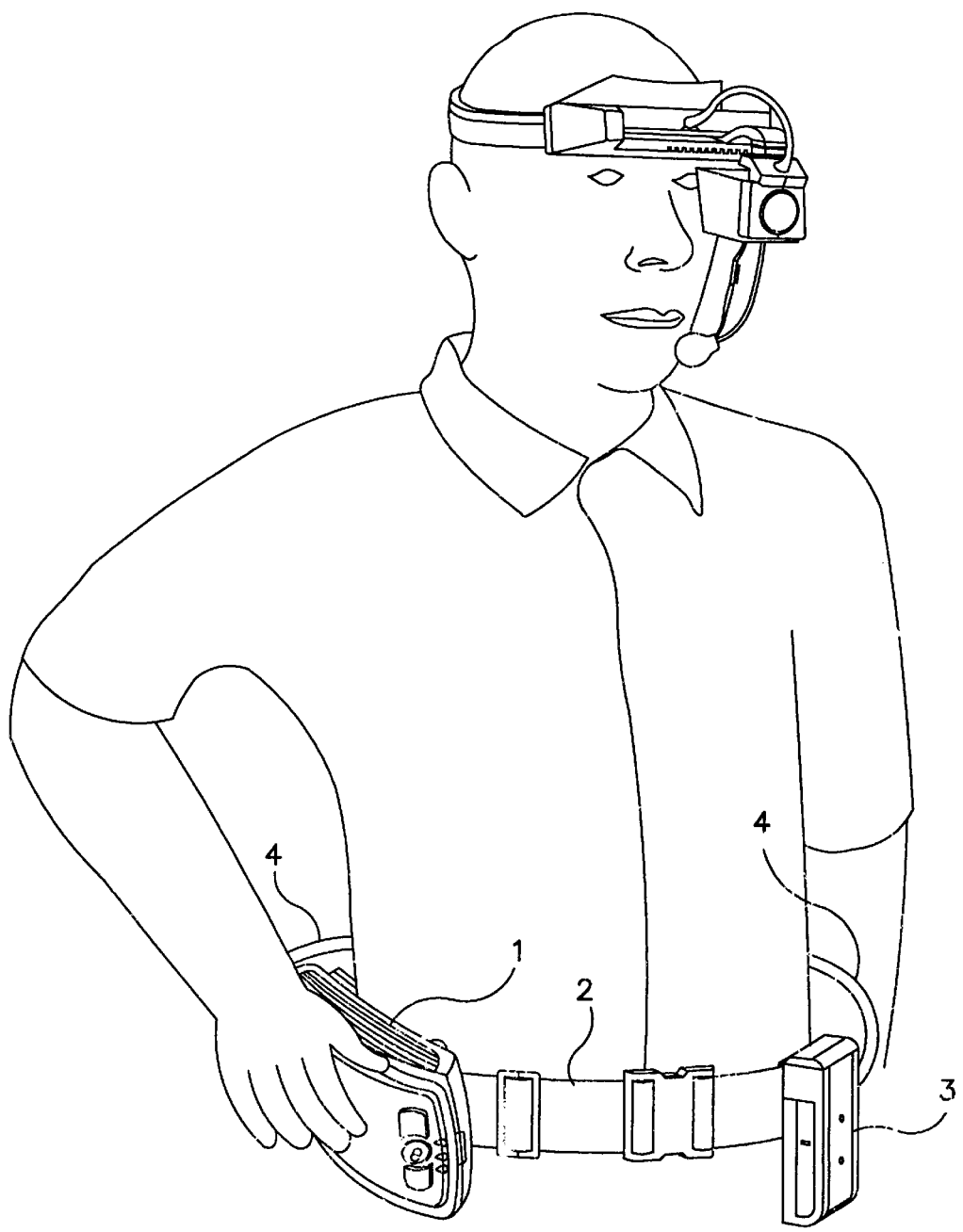
FIG. 1 is a front perspective view of user wearing a prior art wearable computer system where the battery is connected to the computer housing by a cable.

In FIG. 1 a prior art wearable computer-battery system is illustrated. The wearable computer 1 is located on one portion of the waist belt 2 and the battery 3 is located on a separate belt section. The battery 3 is connected to the computer housing 1 by a connecting cable 4 which encircles the user's front or back. The cable 4 may interfere with the user's hands when he or she is attempting to repair an object or machine. For this reason it is desirable for prior devices to extend the cable 4 behind the user so as not to impede the user. However, sometimes the cable gets caught on other objects and disconnects or becomes entangled so as to interfere with proper functioning of the computer system. In addition, the battery becomes awkward to replace and often requires two hands to remove the old battery and insert the new charged battery. In a commonly-owned patent, U.S. Pat. No. 6,235,420 (Ng), a conveniently constructed battery holder is disclosed and claimed. Ng's battery hold is perfectly suited to be used in the present invention and the disclosure of Ng is incorporated by reference into the present disclosure. FIG. 3 of the present disclosure illustrates specifics of the Ng battery holder which is used in a preferred embodiment of this invention.

Figure 2:
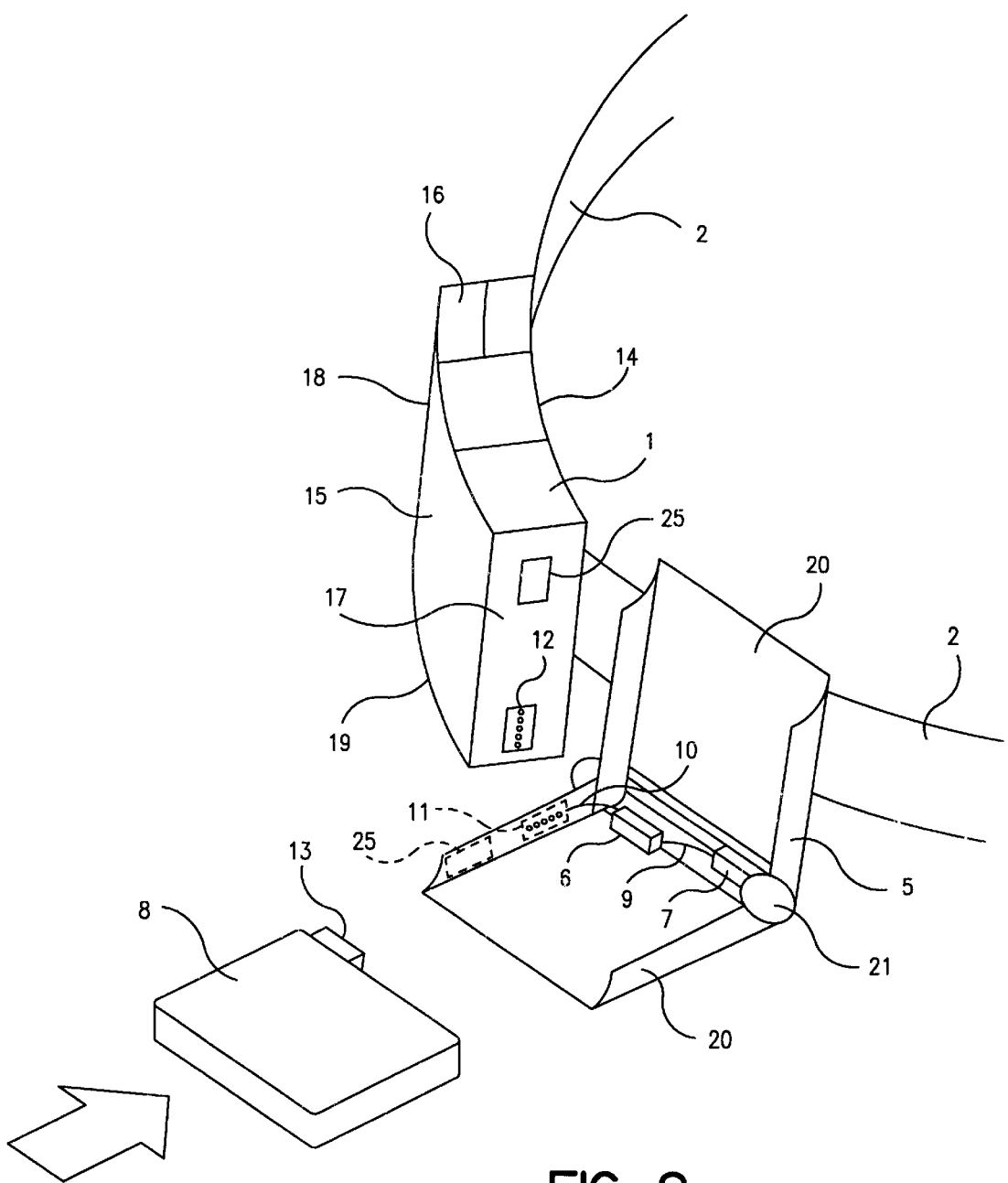
FIG. 2 is a side perspective view of an embodiment of the wearable computer-battery system of the present invention.
Figure 3A:
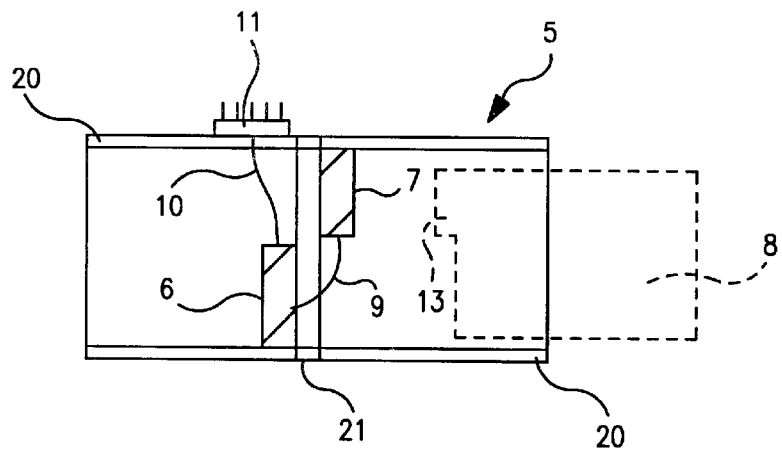
FIG. 3 (including FIGS. 3A to 3E) is a plan view of one embodiment of a battery holder usable in the present invention.
Figure 3B:
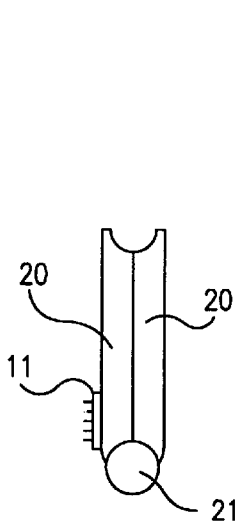
Figure 3C:
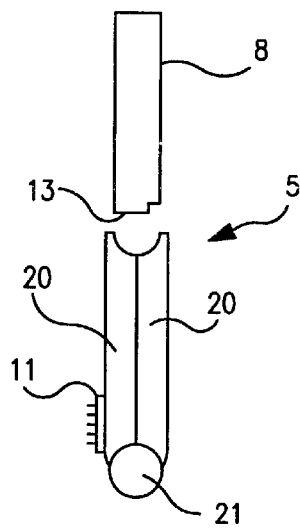
Figure 3D:
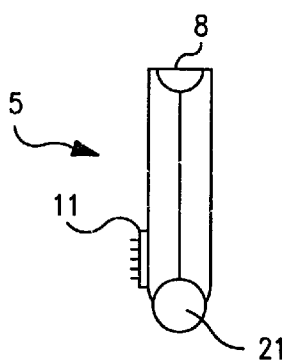
Figure 3E:
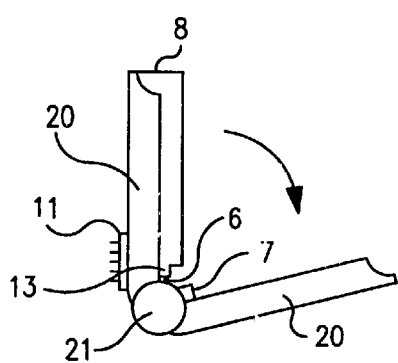
Figure 4:
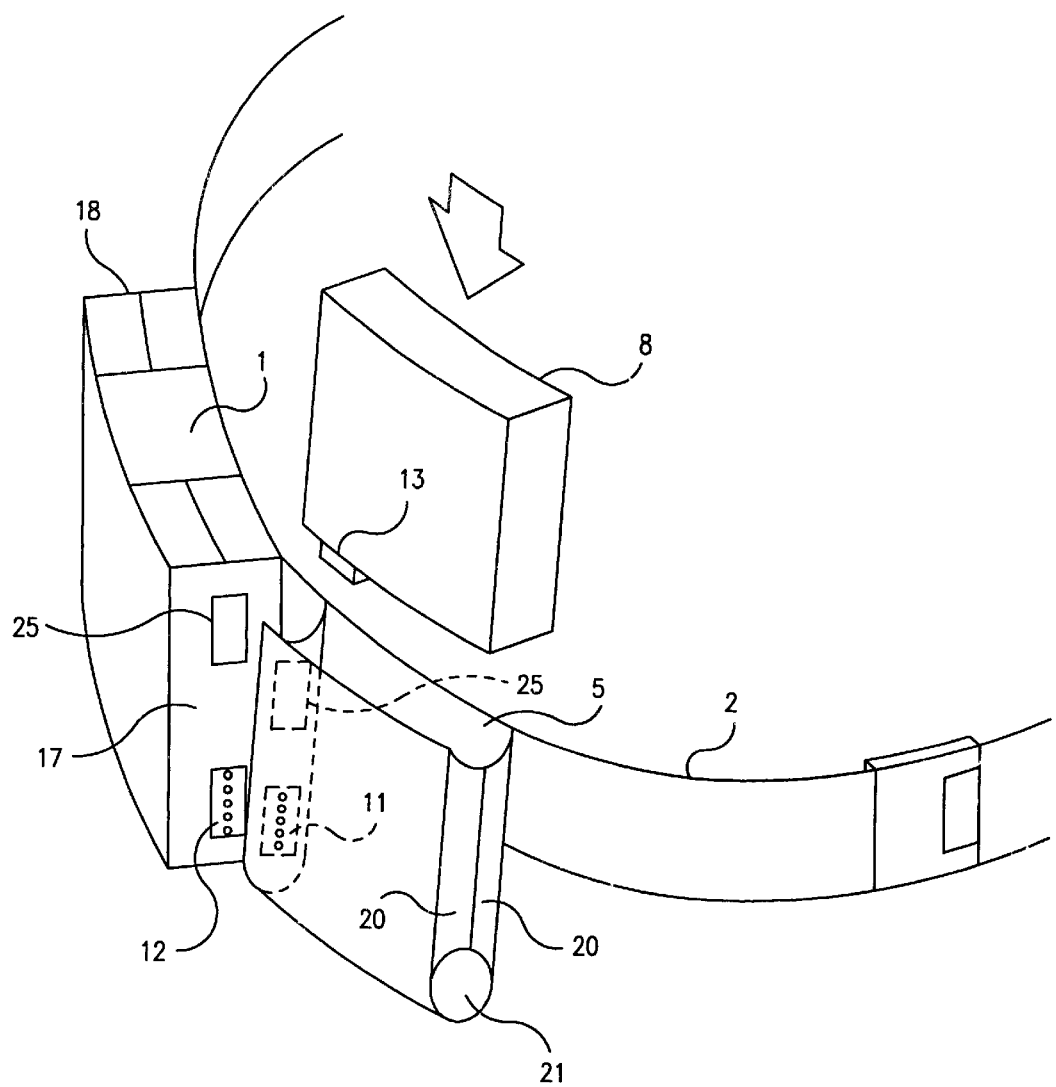
FIG. 4 is a top-side perspective view of an embodiment of the wearable computer-battery system of the present invention.

In FIG. 2 a holder similar to Ng's battery holder 5 is illustrated just prior to battery 6 being inserted therein. Battery holder 5 has two battery connectors 6 and 7. These battery connectors 6 and 7 are positioned 180° from each other when holder 5 is in the open position. Both holder 5 and housing 1 have means for attachment to belt 2. Holder 5 easily flips open to remove an old battery and insert a new battery 8; specifics are disclosed in Ng U.S. Pat. No. 6,235,420. A connecting wire 9 electrically connects connectors 6 and 7 and another electrical wire 10 connects 6 and 7 with a five pin connector or external battery holder connector 11. A mating connecting means 12 is positioned in computer housing 1, once outside holder connector or five pin connector 11 is in electrical contact with mating pin connector 12 power is supplied to the computer or housing 1. While a five pin connector is illustrated, it should be understood that any suitable electrical connection may be used. A connector 25 which could be a magnet, clip or other securing means can be preferably used on side 17 (or other appropriate side) to secure housing 1 to holder 5 via only one side 20. It is important that both housing 1 and holder 5 have mating connecting means 25 whether they be magnets, VELCRO, clips or other suitable connecting means 25. These means 25 will be referred to in the specification and claims as "securing means". In FIG. 2, battery 5 is shown separate from computer housing 1 only for clarity purposes. Battery 8 has a contact 13 that will connect to either battery connectors 6 or 7 when in place. Computer or computer housing 1 has sides 14 (inner side), 15 (front), 16 (top), 17 (forward side), 18 (back side) and bottom 19. The five pin connector or mate 12 is shown on the forward side 17 of the housing 1 but this connection may be positioned at any location on housing 1 except for the inner side 14. For convenience of use it is preferred that connector 12 be located on the forward side 17, back side 18 or bottom 19 (see FIG. 5 for bottom connections). The battery 8 can easily be removed or inserted into battery holder 5 by merely flipping the one unsecured or unattached compartment or cover 20 open with one hand and inserting or removing battery 8. No intruding cable is present, no awkward separated battery 3 is necessary where both hands are needed to remove or change batteries. In one embodiment shown in FIG. 2, covers 20 are movably connected by hinge 21 so that the holder 5 can be easily opened when adding or removing a battery. FIG. 3A shows an open top view of battery holder 5, FIG. 3B shows a side view of empty holder 5 with five pin connector 11 projecting therefrom on one cover 20, leaving the other cover 20 to free to be opened when changing the battery. Connecting means 25 is not shown in FIG. 3 but will be on the same cover 20 as is five pin connector, see FIG. 4. FIG. 3C shows holder 5 just as battery 8 is being inserted therein, FIG. 3D shows holder 5 with battery 8 positioned therein and FIG. 3E illustrates an open side view of holder 5 with battery 8 in contact with battery connector 6.

Figure 5:
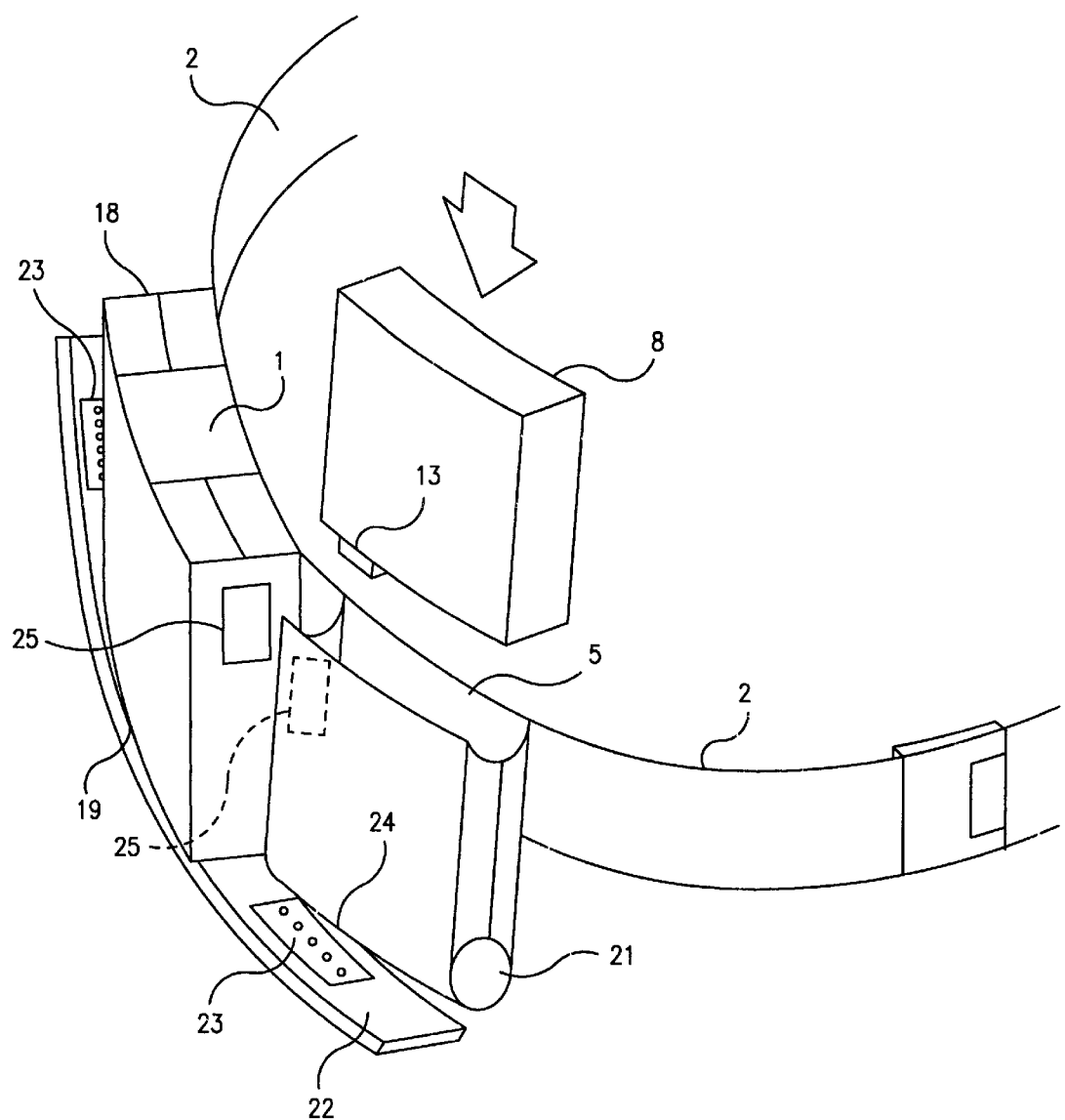
FIG. 5 is a top-side perspective view of another embodiment of the wearable computer-battery system of the present invention.

FIG. 5 is a perspective view showing the locations of five pin connectors or mates 11 and 12 in the forward side 17 of the housing 1. On back side 18 can be located similar connectors (as 12) for connection to an additional battery holder or for a connection to a PCMCIA housing or slot or for a compact flash slot, five wire, USB, built-in wireless system means, cell phone or any other desired component or peripheral.

In FIG. 5 a second embodiment of this invention is shown where a strip connector 22 is used to extend beyond one or both terminal portions or sides 17 and 18 of the computer housing. Here, the strip connector 22 can have one, two or more five pin connectors (or other suitable connectors) 23 located therein. Mating 5 pin connectors can be located in the bottom 19 of the housing 1 and bottom 24 of battery holder 5. The embodiment of this invention shown in FIG. 5 permits cable-free connections of computer 1 with battery holder 5 and allows a plurality of other components or peripherals to be attached onto strip connector 22 which is in electrical contact with computer 1. Communication means such as cell phones, radios or mobile phones may be used with any of the embodiments shown in all of the figures.

The preferred and optimumly preferred embodiments of the present invention have been described herein and shown in the accompanying drawings to illustrate the underlying principles of the invention but it is to be understood that numerous modifications and ramifications may be made without departing from the spirit and scope of this invention.

What is claimed is:

1. A wearable computer system comprising a computer housing having cableless connection means to an attached battery holder, said computer housing being a rigid computer housing comprising a single internal compartment that houses substantially all of the components of a conventional computer, said housing having said battery holder attached thereto with connecting means at a location on said housing other than an inner side which is immediately adjacent the user's body, said battery holder having means to conveniently remove and replace a battery while said wearable computer is in use or being worn by the user.

2. The computer system of claim 1 having communication means in contact therewith.

3. The computer system of claim 1 wherein said housing has an electrical connection on a housing portion other than said inner side, said battery holder having a mate to said electrical connection to thereby provide means for a battery in said battery holder to provide electrical energy to said computer system.

4. The computer system of claim 1 wherein said battery holder comprises two complementary compartments, each of said compartments forming one-half of said housing, said compartments when abutting and adjacent each other having means to house one battery, each of said compartments movably connected to the other compartment, each of said compartments having separate battery connectors in electrical contact with each other and with an external battery holder connector.

5. The computer system of claim 1 wherein said connecting means is a five pin connector.

6. The computer system of claim 1 wherein said housing and said battery holder are immediately attached to each other via said connecting means, and wherein the housing and holder are in physical contact with each other.

7. The computer system of claim 1 wherein said battery holder is in contact with a forward side of said housing.

8. The computer system of claim 1 wherein said battery holder is in contact with a back side of said housing.

9. The computer system of claim 1 wherein said battery holder is in contact with a bottom side of said housing.

10. The computer system of claim 1 wherein said battery holder and said housing are in electrical contact with a strip extending beneath at least a portion of each of said holder and housing.

11. The computer system of claim 1 having means for electrical contact of said battery holder and said computer housing with a member selected from the group consisting of five wire means, USB, built-in wireless means, PCMCIA means, compact flash means, communication means, and mixtures thereof.

12. A wearable computer system comprising a computer housing, a battery holder and connecting means for electrical contact of said housing with said holder, said connecting means located on an exterior portion of said housing with a mating connecting means located on an exterior portion of said battery holder, said computer housing containing all of the components of a conventional computer except for a display, both said computer housing and said battery holder having means for attachment to a user.

13. The computer system of claim 12 having communication means in contact therewith.

14. The computer system of claim 12 wherein said housing has an electrical connection on a housing portion other than said inner side, said battery holder having a mate to said electrical connection to thereby provide means for a battery in said battery holder to provide electrical energy to said computer system.

15. The computer system of claim 12 wherein said battery holder comprises two complementary compartments, each of said compartments forming one-half of said housing, said compartments when abutting and adjacent each other having means to house one battery, each of said compartments movably connected to the other compartment, each of said compartments having separate battery connectors in electrical contact with each other and with an external holder connector.

16. The computer system of claim 12 wherein said connecting means is a five pin connector.

17. The computer system of claim 12 wherein said housing and said battery holder are immediately attached to each other via said connecting means, and wherein the housing and holder are in physical contact with each other.

18. The computer system of claim 12 wherein said battery holder is in contact with a forward side of said housing.

19. The computer system of claim 12 wherein said battery holder is in contact with a back side of said housing.

20. The computer system of claim 12 wherein said battery holder is in contact with a bottom side of said housing.

21. The computer system of claim 12 wherein said battery holder and said housing are in electrical contact with a strip extending beneath at least a portion of each of said holder and housing.

22. The computer system of claim 12 having means for electrical contact of said battery holder and said computer housing with a member selected from the group consisting of PCMCIA means, compact flash means, communication means, and mixtures thereof.

23. The computer system of claim 12 having securing means to hold said housing and said holder firmly together.

* * * * *